United States Patent
Schwarz et al.

(10) Patent No.: US 10,526,002 B2
(45) Date of Patent: Jan. 7, 2020

(54) ARRANGEMENT OF A STEERING WHEEL IN A MOTOR VEHICLE SUITABLE FOR AUTONOMOUS DRIVING

(71) Applicant: Bayerische Motoren Werke Aktiengesellschaft, Munich (DE)

(72) Inventors: Felix Schwarz, Munich (DE); Philipp Kerschbaum, Munich (DE); Julian Eichhorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 109 days.

(21) Appl. No.: 15/786,740

(22) Filed: Oct. 18, 2017

(65) Prior Publication Data
US 2018/0037248 A1  Feb. 8, 2018

Related U.S. Application Data

(63) Continuation of application No. PCT/EP2016/054365, filed on Mar. 2, 2016.

(30) Foreign Application Priority Data

Apr. 23, 2015 (DE) .................. 10 2015 207 477

(51) Int. Cl.
*B62D 1/183* (2006.01)
*B62D 1/04* (2006.01)
(Continued)

(52) U.S. Cl.
CPC .......... *B62D 1/183* (2013.01); *B60W 50/082* (2013.01); *B60W 50/12* (2013.01); *B62D 1/04* (2013.01); *B62D 1/187* (2013.01); *B62D 1/286* (2013.01)

(58) Field of Classification Search
CPC .......... B62D 1/286; B62D 1/183; B62D 1/04; B60W 50/082
See application file for complete search history.

(56) References Cited

U.S. PATENT DOCUMENTS 2,683,996 A * 7/1954 Rabe ................. B62D 1/10
74/551.6
4,503,504 A * 3/1985 Suzumura ............. B60R 1/07
280/775

(Continued)

FOREIGN PATENT DOCUMENTS

DE    19 16 652 U    5/1965
DE    697 08 735 T2  7/2002
(Continued)

OTHER PUBLICATIONS

International Search Report (PCT/ISA/210) issued in PCT Application No. PCT/EP2016/054365 dated May 30, 2016 with English translation (six pages).

(Continued)

*Primary Examiner* — Nicole T Verley
(74) *Attorney, Agent, or Firm* — Crowell & Moring LLP

(57) ABSTRACT

An arrangement of a steering wheel in a motor vehicle suitable for autonomous driving is provided, wherein the steering wheel can be pivoted or tilted from a usage position into a rest position, in which the driver of the vehicle can still specify a steering request by rotating the steering wheel. The pivoting or tilting of the steering wheel from the usage position into the rest position switches on an autonomous vehicle operating mode, in which the vehicle moves along the roadway without assistance from the driver, whereas pivoting or tilting of the steering wheel from the rest position into the usage position switches off the autonomous vehicle operating mode. For this purpose, the steering wheel rim can be pivotably or tiltably attached to a spoke of the steering (Continued)

wheel, which spoke is stationary or connected to the steering wheel rim. The steering wheel rim can be guided within a rim guide sleeve such that the steering wheel rim can be rotated about the axis of rotation of the steering wheel, which rim guide sleeve in turn can be pivoted in a guiding end of the spoke about a pivot axis that extends parallel to a tangent of the steering wheel rim at the point of intersection with the spoke longitudinal axis.

6 Claims, 3 Drawing Sheets

(51) Int. Cl.
*B62D 1/28* (2006.01)
*B60W 50/08* (2012.01)
*B60W 50/12* (2012.01)
*B62D 1/187* (2006.01)

(56) References Cited

U.S. PATENT DOCUMENTS

| | | | |
|---|---|---|---|
| 6,070,686 A * | 6/2000 | Pollmann | B60R 25/0221 180/287 |
| 7,862,084 B2 * | 1/2011 | Maeda | B60K 37/00 180/402 |
| 9,630,644 B2 * | 4/2017 | Soderlind | B62D 1/181 |
| 2002/0059848 A1 * | 5/2002 | Adomeit | B62D 1/105 74/498 |
| 2013/0002416 A1 | 1/2013 | Gazit | |
| 2014/0260761 A1 * | 9/2014 | Soderlind | B62D 1/181 74/493 |
| 2016/0244070 A1 | 8/2016 | Bendewald et al. | |
| 2016/0362126 A1 * | 12/2016 | Lubischer | B62D 1/183 |
| 2016/0368522 A1 * | 12/2016 | Lubischer | B62D 1/181 |
| 2017/0297606 A1 * | 10/2017 | Kim | B62D 1/181 |
| 2018/0244175 A1 * | 8/2018 | Tan | B60N 2/0248 |
| 2018/0273081 A1 * | 9/2018 | Lubischer | B62D 1/183 |
| 2018/0334183 A1 * | 11/2018 | Beauregard | B62D 1/06 |
| 2019/0002010 A1 * | 1/2019 | Cao | B62D 5/0412 |
| 2019/0071113 A1 * | 3/2019 | Board | B62D 1/11 |

FOREIGN PATENT DOCUMENTS

| | | | | |
|---|---|---|---|---|
| DE | 10 2006 006 995 B4 | 9/2008 | | |
| DE | 102 59 684 B4 | 9/2010 | | |
| DE | 10 2013 110 865 A1 | 4/2015 | | |
| DE | 102016013964 A1 * | 5/2017 | | B60N 2/16 |
| EP | 0 802 105 A2 | 10/1997 | | |
| EP | 0802105 A2 * | 10/1997 | | B62D 1/10 |
| FR | 2806042 A1 * | 9/2001 | | B60K 37/00 |
| FR | 2861657 A1 * | 5/2005 | | B60R 11/0235 |
| GB | 2457244 A * | 8/2009 | | B60N 2/143 |
| JP | 58-170660 A | 10/1983 | | |
| WO | WO-2018109039 A1 * | 6/2018 | | B62D 1/10 |

OTHER PUBLICATIONS

German-language Written Opinion (PCT/ISA/237) issued in PCT Application No. PCT/EP2016/054365 dated May 30, 2016 (six pages).

German-language Search Report issued in counterpart German Application No. 10 2015 207 477.3 dated Nov. 30, 2015 with partial English translation (11 pages).

* cited by examiner

ARRANGEMENT OF A STEERING WHEEL IN A MOTOR VEHICLE SUITABLE FOR AUTONOMOUS DRIVING

CROSS REFERENCE TO RELATED APPLICATIONS

This application is a continuation of PCT International Application No. PCT/EP2016/054365, filed Mar. 2, 2016, which claims priority under 35 U.S.C. § 119 from German Patent Application No. 10 2015 207 477.3, filed Apr. 23, 2015, the entire disclosures of which are herein expressly incorporated by reference.

BACKGROUND AND SUMMARY OF THE INVENTION

The invention relates to an arrangement of a steering wheel in a motor vehicle suitable for autonomous driving, wherein the steering wheel is pivotable or tiltable from a usage position into a rest position, in which the driver of the vehicle can continue to predefine a steering demand by rotating the steering wheel. With regard to the prior art, reference is made to DE 697 08 735 T2, DE 102 59 684 B4 and DE 19 16 652 U, as well as DE 10 2006 006 995 B4.

The so-called autonomous or highly automated driving of non-track-bound motor vehicles is basically known, which vehicles will in future travel in electronically controlled fashion without input from the driver even in public traffic on roadways. From DE 10 2006 006 995 B4, it is furthermore known for the steering wheel of the driver, which in the case of autonomous driving, that is to say when the driver does not need to predefine a steering movement for the vehicle, is required only for any emergency interventions by the driver, to be adjustable from an initially relatively large geometrical form to a small geometrical form. Such a change in form is performed automatically in a manner dependent on the activation and deactivation of what is referred to in this document as an autopilot system.

The further cited documents present tiltable (DE 697 08 735 T2, DE 19 16 652 U) or pivotable (DE 102 59 684 B4) steering wheel arrangements which are intended to facilitate the embarking and disembarking of the driver into and out of the vehicle. Here, during the tilting movement, the steering wheel, which as it were describes a plane, is rotated about an axis which lies in or parallel to said plane. In the course of the pivoting movement, the steering wheel is rotated about an axis which lies substantially perpendicular to the steering wheel plane.

It is an object of the invention to provide an arrangement of a motor vehicle steering wheel which is particularly advantageous for autonomous or highly automated driving.

This and other objects are achieved by an arrangement of a steering wheel in a motor vehicle suitable for autonomous driving, wherein the steering wheel is pivotable or tiltable from a usage position into a rest position, in which the driver of the vehicle can continue to predefine a steering demand by rotating the steering wheel, and wherein a pivoting or tilting of the steering wheel from the usage position into the rest position activates an autonomous vehicle operating mode in which the vehicle moves along the roadway without input from the driver, whereas a pivoting or tilting of the steering wheel from the rest position into the usage position deactivates the autonomous vehicle operating mode.

It is thus proposed firstly that, during or for the autonomous driving, the steering wheel be displaced into a rest position in such a way that the driver's view of the dashboard, which is normally situated behind and partially concealed by the steering wheel in the usage position thereof, and in particular of a display screen provided in said dashboard in the conventional manner, is obscured to a much lesser extent by the steering wheel. At the same time, the driver can actuate the steering wheel in such a rest position in a similar manner to that with which he or she is familiar from the usage position of the steering wheel. This is not ensured in the case of a steering wheel which deforms, as it were, as per the above-cited DE 10 2006 006 995 B4. In particular, however, it is proposed in the present case that the operating state of autonomous driving be activated and deactivated directly as a result of the tilting or pivoting of the steering wheel. Thus, if the vehicle is initially being controlled entirely by the driver and the steering wheel is in the usage position, it is then the case, if the driver tilts or pivots the steering wheel out of this position into its so-called rest position, that the operating mode of autonomous driving is activated. If the driver, at a somewhat later point in time, moves the steering wheel from the rest position into the usage position, then the operating mode of autonomous driving, which is controlled in the conventional manner by an electronic control unit, is deactivated owing to said steering wheel displacement. Here, the steering wheel arrangement may be equipped with a blocking device which permits a manual displacement of the steering wheel by the driver from the usage position into the rest position only if an autonomous driving mode is actually possible, which can be identified by the abovementioned electronic control unit, which can thereupon suitably actuate said blocking device. Furthermore, to facilitate embarking and disembarking, it may be provided that the blocking device permits the tilting or pivoting movement when the vehicle is parked, that is to say when it is not intended for the vehicle to be moved (any further).

A particular advantage of a steering wheel arrangement proposed thus far can be seen in the fact that the driver can activate and deactivate the operating mode of autonomous driving in an intuitively and extremely simple manner, and can at the same time displace the steering wheel into a less obstructive position, or into the respectively associated position, without multiple hand movements, or even a complex motor adjustment mechanism, being necessary for this purpose. It is furthermore also pointed out that, instead of a steering wheel arrangement of this type, there is also provided a method for activating and deactivating a highly automated (autonomous) operating or driving state of a vehicle with simultaneous displacement of the steering wheel between a usage position and a rest position, that is to say the claimed steering wheel arrangement could also be utilized in the method.

A tilting or pivot axis about which the steering wheel is tiltable or pivotable may basically be positioned in a manner adapted to the respective spatial conditions in the vehicle interior compartment. It is preferable, owing to a relatively large gain n space in the rest position that is thereby achievable, if the steering wheel (or in particular the (otherwise conventional) steering-wheel rim) is attached pivotably or tiltably to that end of a or the spoke of the steering wheel which is averted from a hub of the steering wheel or from a fastening point of a spoke to the dashboard. In particular, if the steering wheel is arranged such that a first plane (see dotted line 23 in FIG. 1B) described by the usage position thereof is oriented at least approximately vertically (as is the case in conventional passenger motor vehicles) and a second plane (see dashed line 25 in FIG. 2B) described by the rest position of the steering wheel is oriented at least approximately horizontally, which planes can thus enclose an angle in the range from 70° to 110°, it is advantageous if the steering-wheel rim is attached pivotably or tiltably close to the or a spoke of said type of the steering wheel, which spoke, in a neutral position of the steering wheel (that is to say a steering wheel rotational angle position in which the vehicle travels straight ahead), runs at least inter alia downward in the vertical direction in a plane which extends parallel to the longitudinal axis of the vehicle and in the vertical direction and which encompasses the steering wheel axis of rotation. The above-stated angle range is however in no way obligatory; rather, a first plane of the steering wheel in a usage position may also enclose angles in the range from 30° to 100° with a second plane formed by the rest position of the steering wheel, which values are however once again not to be understood as fixed limit values but are intended merely to mark out a certain scope.

Furthermore, the preferably single spoke by way of which the steering-wheel rim is mounted in some way, for example on the dashboard of the vehicle, may be either a static spoke, on whose end section averted from its fastening point on the dashboard the steering-wheel rim is rotatably mounted. Or, the spoke may be rotatable together with the steering-wheel rim, such that, as viewed in the direction of rotation of the steering wheel, the spoke is fixedly connected to the steering-wheel rim, but said steering-wheel rim may be pivotable or tiltable relative to the spoke. Furthermore, it may also be provided that the steering-wheel rim can be tilted or pivoted together with at least one spoke.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
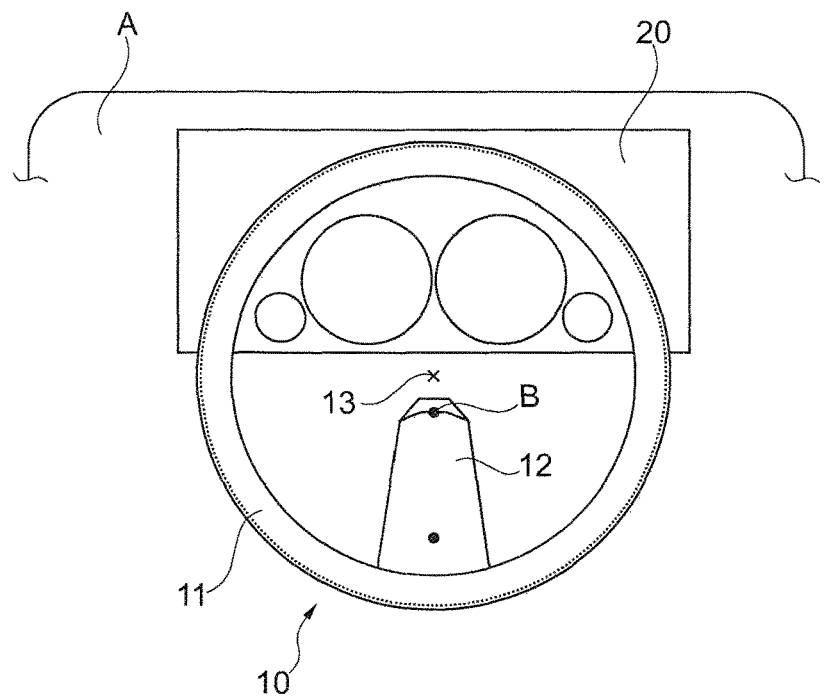
FIGS. 1A and 1B are diagrammatic illustrations of an embodiment of a steering wheel arrangement according to the invention, wherein the steering wheel is situated in the usage position in FIGS. 1A and 1B, with FIG. 1A illustrating a view seen by a driver of the vehicle, and FIG. 1B illustrating a respective side view in a vehicle transverse direction.
Figure 1B:
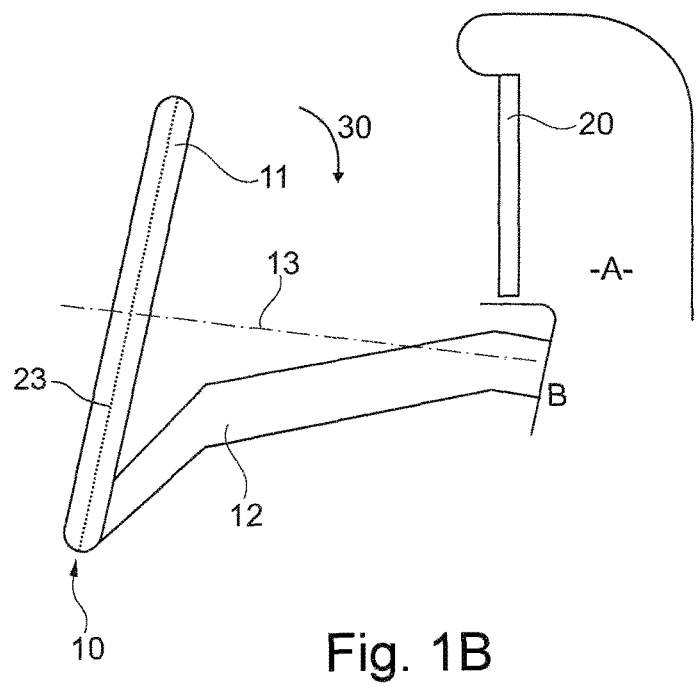

Referring firstly to FIG. 1A, said figure shows an on-board monitor 20 which is arranged in the dashboard A (not illustrated in any more detail) of a passenger motor vehicle, on which on-board monitor various displays are presented which are depicted to the driver of the passenger motor vehicle; in the conventional manner, the windshield (not shown) is situated above the on-board monitor 20 and the dashboard A. Between the on-board monitor 20 and the driver, who is situated at the position of the viewer of said FIG. 1A, there is situated, in the conventional manner, a steering wheel 10 which is composed, in the conventional manner, of a steering-wheel rim 11 and, in this case, of only a single spoke 12, whose end opposite the steering-wheel rim 11 is fastened to the dashboard at a fastening point B. The axis of rotation 13 of the steering wheel 10, which in this case is indicated merely by a cross for the sake of simplicity, runs very close to the fastening point B, which axis of rotation normally runs only approximately perpendicular to the present drawing plane. FIG. 1B shows the elements discussed thus far in a side view.

Figure 2A:
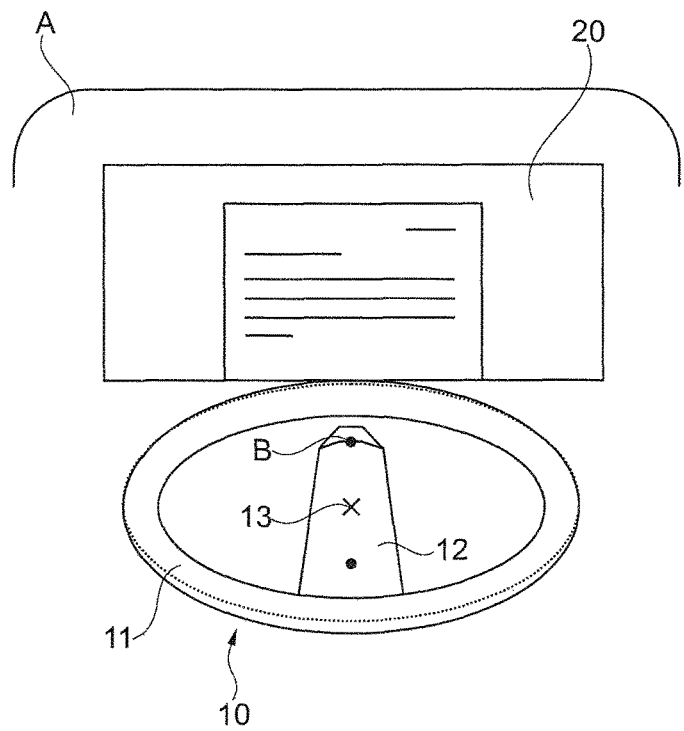
FIGS. 2A and 2B are diagrammatic illustrations of an embodiment of a steering wheel arrangement according to the invention, wherein the steering wheel is situated in the rest position in FIGS. 2A and 2B, with FIG. 2A illustrating a view seen by a driver of the vehicle, and FIG. 2B illustrating a respective side view in a vehicle transverse direction.
Figure 2B:
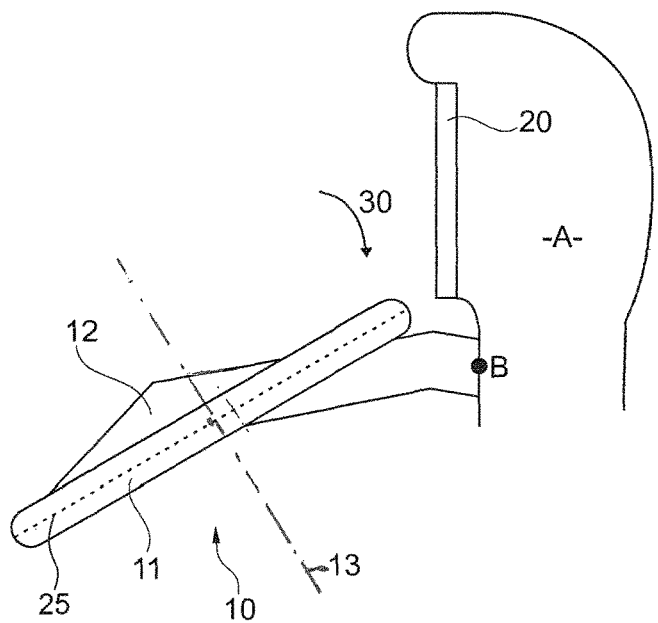

A comparison of FIG. 1B with FIG. 2B shows that, in the state as per FIG. 2B, the steering-wheel rim 11, which is guided rotatably on that end of the, in this case, static spoke 12 which faces toward the steering-wheel rim in a manner described in more detail below, has, with its upper section, that is to say the section which in FIG. 1A is situated above the spoke 12 and thus partially conceals the on-board monitor 20, been pivoted away or tilted, as it were, downward (as per arrow 30). The tilting or pivoting-away about that end of the spoke 12 which faces toward the steering-wheel rim 11 then affords the driver a completely unobstructed view of the on-board monitor 20, as shown in FIG. 2A.

As was discussed in detail prior to the description of the figures, the steering wheel 10 is situated in the position illustrated in FIGS. 2A, 2B when the vehicle equipped with said steering wheel 10 is travelling in an autonomous or highly automated driving mode. In the case of such autonomous driving, the vehicle automatically follows a predefined driving lane without the driver himself or herself having to impart a steering action; here, however, the driver can impart an active steering action if he or she wishes, that is to say can continue to predefine a steering demand using the steering wheel 10. Here, proceeding from a position of the steering wheel 10 as per FIGS. 1A, 1B, the driver activates the mode of autonomous driving by virtue of the driver tilting the steering wheel 10 as per the arrow 30 into the position illustrated in FIGS. 2A, 2B. Correspondingly, proceeding from the position of the steering wheel 10 as per FIGS. 2A, 2B, the driver can deactivate the mode of autonomous driving, and re-assume full control of the vehicle, by pivoting the steering wheel 10 counter to the arrow direction 30 back into the position illustrated in FIGS. 1A, 1B.

Figure 3:
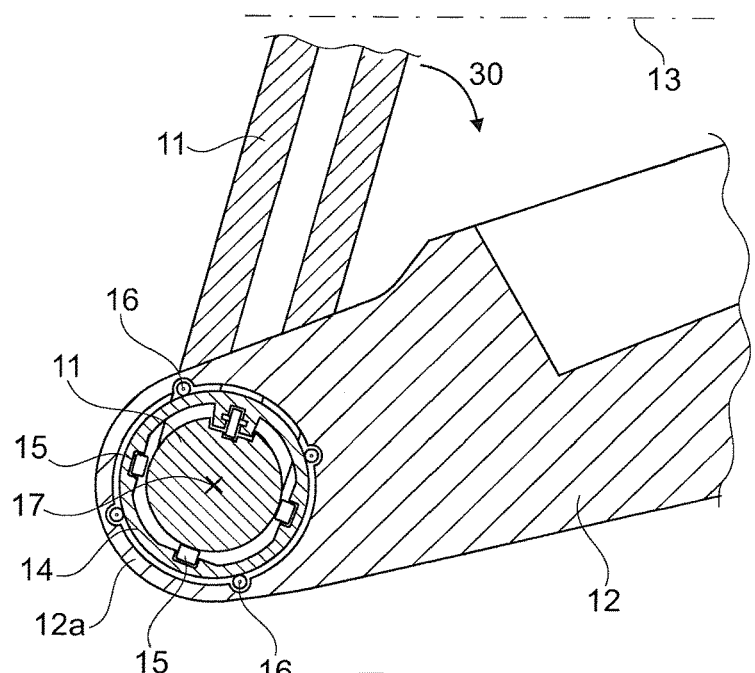
FIG. 3 shows a possible variant of a tiltable steering wheel in an embodiment with a static spoke, in a detail and in section; the respective section plane lies in the vehicle longitudinal direction and vertical direction in said spoke, which in this case advantageously extends at least inter alia downward in the vertical direction, in a plane which extends parallel to the longitudinal axis of the vehicle and in the vertical direction, proceeding from its fastening point on the dashboard.

FIG. 3 shows, in a section view, a first possible embodiment as regards to how the rim 11 of a steering wheel 10 can be mounted on a static, that is to say non-displaceable, spoke 12. The section plane in the drawing lies in this case in the spoke 12, and only a section of the steering-wheel rim 11 situated close to the spoke is illustrated. As can be seen, it is the case here that the steering-wheel rim 11 is led through a ring-shaped rim guide sleeve 14 and is mounted relative thereto by means of in this case four roller-type rolling bearing bodies 15, in such a way that the steering-wheel rim 11 can be rotated about the steering wheel axis of rotation 13 which lies in the plane of the drawing and which runs approximately horizontally. The section surface, visible to the viewer of the figure, of the rim 11 is moved out of the drawing plane towards the viewer or away from the viewer. The rim guide sleeve 14 is in turn mounted in a guide end section 12a, which forms a segment of a torus, of the spoke 12 (at the free end thereof, or at the end facing toward the rim 11) by means of multiple—in the present section plane four—ball-type rolling bearing bodies 16, in such a way that the steering-wheel rim 11 can be tilted or pivoted as per arrow 30 (as has been discussed on the basis of FIGS. 1A, 1B, 2A, 2B). Thus, the rim guide sleeve 14 is pivotable about a pivot axis 17 which runs parallel to a tangent to the steering-wheel rim 11 at the point of intersection with the spoke longitudinal axis, which pivot axis runs, in FIG. 3, perpendicular to the plane of the drawing through the central point of the visible section surface of the rim 11.

Figure 4:
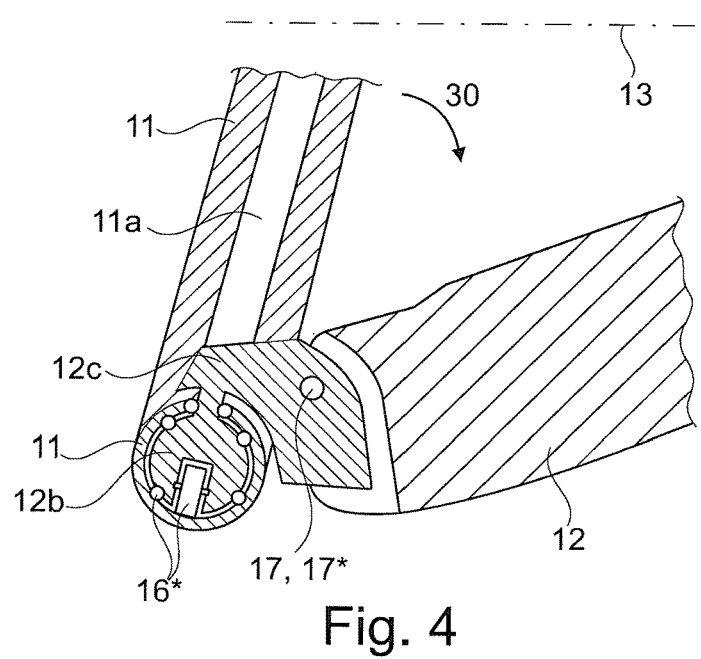
FIG. 4 shows another possible variant of a tiltable steering wheel in an embodiment with a static spoke, in a detail and in section; the respective section plane lies in the vehicle longitudinal direction and vertical direction in said spoke, which in this case advantageously extends at least inter alia downward in the vertical direction, in a plane which extends parallel to the longitudinal axis of the vehicle and in the vertical direction, proceeding from its fastening point on the dashboard.

FIG. 4 shows, in a section, a second possible embodiment as regards to how the rim 11 of a steering wheel 10 according to the invention can be mounted on a static, that is to say non-displaceable, spoke 12. The section plane in the drawing lies (once again) in the spoke 12, and only a section of the steering-wheel rim 11 situated close to the spoke is illustrated. As can be seen, the steering-wheel rim 11 is of hollow form and is guided on a guide end section 12b, which describes a circular-ring-shaped segment, of the spoke 12 so as to be rotatable about the axis of rotation 13 of the steering wheel 10, which lies in the same manner in this exemplary embodiment as in the example as per FIG. 3. The guide end section 12b is articulatedly connected by way of a web 12c, for the passage of which through the steering-wheel rim 11 an encircling cutout 11a is provided on the inner circumference of said steering-wheel rim 11, to the static section of the spoke 12 in such a way that the guide end section 12b and thus also the steering-wheel rim 11 are pivotable about a pivot axis 17 running parallel to a tangent to the steering-wheel rim 11 at the point of intersection with the spoke longitudinal axis, which pivot axis, in FIG. 4 (also), runs perpendicular to the drawing plane but in this case through the articulated articulation point 17\* of the guide end section 12b on the static section of the spoke 12. Here, similarly to the preceding exemplary embodiment, the steering-wheel rim 11 is mounted on the guide end section 12b by way of multiple rolling bearing bodies 16\*, though this, along with numerous further details in particular of a structural nature, may by all means be configured differently from the explanations above without departing from the spirit and scope of the invention.

For the sake of completeness, it is pointed out here that the steering wheel 10 shown in the present figures is a steering wheel for a so-called steer-by-wire system (such as is known to a person skilled in the art) of the motor vehicle, that is to say, here, there is no mechanical shaft-type connection between the steering wheel 10 and the steerable wheels of the vehicle, and the steering demand of the driver at the steering wheel is determined electronically by use of a suitable sensor arrangement (not shown here) between the steering-wheel rim 11 and the spoke 12. As an alternative to this, the present invention may however by all means also be realized in the case of a steering wheel which ultimately acts mechanically (via a steering shaft) on the steerable vehicle wheels, wherein the steering-wheel rim may be tiltable relative to a spoke which rotates conjointly therewith, or it is also possible for the steering-wheel rim and the spoke(s) to be tiltable or pivotable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering wheel arrangement in a motor vehicle suitable for autonomous driving, the arrangement comprising:
   a steering wheel operatively configured to be pivotable or tiltable from a usage position into a rest position, in which rest position rotation of the steering wheel continues to define a steering demand, wherein
   the pivoting or tilting of the steering wheel from the usage position into the rest position is configured to activate an autonomous vehicle operating mode in which the vehicle travels without a driver input,
   the pivoting or tilting of the steering wheel from the rest position into the usage position is configured to deactivate the autonomous vehicle operating mode, and
   a steering-wheel rim of the steering wheel is attached pivotably or tiltably to a static spoke of the steering wheel.

2. The steering wheel arrangement as claimed in claim 1, wherein
   the steering-wheel rim, which is of hollow form, is guided on a guide end section of the static spoke so as to be rotatable about an axis of rotation of the steering wheel, which guide end section is itself pivotable about a pivot axis which runs parallel to a tangent to the steering-wheel rim at a point of intersection with a spoke longitudinal axis.

3. The steering wheel arrangement as claimed in claim 1, wherein
   the steering-wheel rim is guided within a rim guide sleeve so as to be rotatable about an axis of rotation of the steering wheel, which rim guide sleeve is in turn pivotable, in a guide end section of the static spoke, about a pivot axis running parallel to a tangent to the steering-wheel rim at a point of intersection with the spoke longitudinal axis.

4. The steering wheel arrangement as claimed in claim 1, wherein
   the steering wheel, in the usage position, describes a first plane which encloses an angle in the range from 30° to 100° with a second plane formed by the rest position.

5. The steering wheel arrangement as claimed in claim 4, wherein
   the first plane of the usage position is oriented at least approximately vertically and the second plane of the rest position is oriented at least approximately horizontally, and the steering-wheel rim is attached pivotably or tiltably to that end the spoke of the steering wheel which is opposite a hub of the steering wheel or from a fastening point of a spoke to a dashboard, which spoke, in a neutral position of the steering wheel, extends downward in a vertical direction in a plane which extends parallel to the longitudinal axis of the vehicle and in the vertical direction and which encompasses the steering wheel axis of rotation.

6. The steering wheel arrangement as claimed in claim 1, further comprising:

a blocking device configured to permit a manual displacement of the steering wheel by the driver from the usage position into the rest position only if the autonomous driving mode is possible or if the vehicle is parked.

\* \* \* \* \*